United States Patent [19]
Crochet et al.

[11] Patent Number: 6,053,200
[45] Date of Patent: Apr. 25, 2000

[54] PROCESS INSTRUMENT ISOLATION VALVE

[75] Inventors: Kevin Crochet, Metairie; Edward A. Sentilles, III, Lacombe, both of La.

[73] Assignee: ProVaCon, Inc., Reserve, La.

[21] Appl. No.: 09/167,829

[22] Filed: Oct. 7, 1998

[51] Int. Cl.[7] .................................................. F16K 37/12
[52] U.S. Cl. ........................ 137/557; 137/872; 251/269; 251/368
[58] Field of Search .................................. 251/368, 144, 251/268, 269; 137/557, 872, 886

[56] References Cited

U.S. PATENT DOCUMENTS

| | | | |
|---|---|---|---|
| 1,558,789 | 10/1925 | Carney | 137/886 |
| 2,169,043 | 8/1939 | Goehring | 137/886 |
| 2,657,005 | 10/1953 | Van Nest | 137/269 |
| 3,361,160 | 1/1968 | Alper | 137/557 |
| 4,782,861 | 11/1988 | Ross | 137/872 |

OTHER PUBLICATIONS

High Integrity Valves Descote, Inc. flyer on Gland Packed or Bellows Sealed 3 Way Valve.

*Primary Examiner*—A. Michael Chambers
*Attorney, Agent, or Firm*—Roy, Kiesel & Tucker

[57] ABSTRACT

A process instrument isolation valve is disclosed having a valve body, a plurality of valve seats, a stem, a plug attached to the stem, and an actuator. The valve has an inlet, a sensor port and a vent port. In use, the valve is opened allowing process material to enter the sensor port where a measurement is taken. When measurement is complete, the valve is closed. As the valve closes, process material exits the valve through the vent port while at the same closing off the valve to the process, preventing process material from flowing from the process to the vent line.

8 Claims, 2 Drawing Sheets

PROCESS INSTRUMENT ISOLATION VALVE

BACKGROUND OF THE INVENTION

1. Field of the Invention

This invention relates to valves, more particularly to process instrument isolation valves used in connection with toxic and corrosive materials.

2. Prior Art

In various industries, especially in the chemical industry, toxic and corrosive chemicals are used in a variety of ways. During processing of these chemicals, it is important to measure key properties of the chemicals including temperature and pressure. There are historical problems with the use of prior gauging methods. First, there is exposure of the toxic and corrosive chemicals to humans. Exposure can occur through numerous leak paths in the valves including the stem and any connection lines. Leaks also occur around the seals when the valves have monitors or sensors attached thereto. These leaks result in residual amounts of chemical being trapped within the valve body, sealed off from the tank or process lines, when the valve is operated. Second, there are multiple leak paths created by the use of multiple leak valves. When more than one property of a particular substance is to be measured, the leak paths are often multiplied by the number of different valves used. Thus, there exists a need for a single unit that can have interchangeable sensors where the changing of the sensors will not expose the operator to the toxic characteristics of the substance being measured.

OBJECTS OF THE INVENTION

With the aforementioned considerations in mind, it is therefore an object of this invention to provide a safe and effective valve attachment for a sensing device to monitor toxic and corrosive substances in process lines and tanks.

It is a further object of this invention to provide a single process instrument isolation valve that allows changing and isolation of instruments negating the need to change the valve when the instruments are removed or interchanged.

It is a further object of this invention to allow the environmentally safe evacuation of process lines.

It is a further object of this invention to provide a process instrument isolation valve with interchangeable seats to allow for easy maintenance of the valve without complete replacement.

SUMMARY OF THE INVENTION

The invention generally comprises the combination of a process apparatus, a valve attached to the process apparatus, and a sensor in fluid communication with the valve, whereby the properties of toxic substances can be measured without exposure of the substances to the environment. The design of the invention also allows the evacuation of process lines. The valve comprises a valve body having an inlet end attachable to and in fluid communication with the process apparatus; a first valve seat positioned in the valve body, a stem chamber extending through the valve body, the stem chamber having an upper port, a first seat port, a second seat port, a vent port and a sensor port; the upper port, the first seat port, the vent port, and the sensor port fluidly communicating with the stem chamber, the second seat port fluidly positioned between the sensor port and the vent port, the vent port fluidly positioned between the second seat port and the upper port; a second valve seat fluidly positioned in the valve body and fluidly positioned between sensor port and the vent port, a valve stem slidably and sealingly positioned in the valve body and extending into the stem chamber, the valve stem having a plug end positioned with the stem chamber; a plug attached to the plug end of the valve stem, the plug having a first plug sealing surface and a second plug sealing surface, the first plug sealing surface adapted to be sealingly engageable with the first valve seat, the second plug sealing surface adapted to be sealingly engageable with the second valve seat; and, an actuator connected to the valve stem. In other embodiments the combination can further comprise first and second plug sealing surfaces including an annular band of material having a hardness greater than that of the first and second valve seats. The combination can further comprise an annular first seat insert, the first seat insert sealingly engageable with the valve body through an inlet in the valve body near the inlet end, the first seat insert allowing fluid communication between the process apparatus and the stem chamber through the first seat port, the first seat insert having the first valve sealing surface. The valve can further comprise a sealing shroud member, packing or o-ring seals positioned in the stem chamber, the valve stem extending through the sealing shroud, the sealing shroud having a yoke end and a stem end, the yoke end being sealingly engaged with the valve body above the plug, the stem end of the sealing shroud being sealingly connected to the valve stem above the second port. The combination can further comprise an annular second seat insert sealingly engageable with the valve body through the upper port, the second seat insert allowing the stem to extend therethrough, the second seat insert further having an aperture therein so that the stem chamber and the vent port are in fluid communication.

DETAILED DESCRIPTION OF PREFERRED EMBODIMENTS OF THE INVENTION

Process instrument isolation valve 1 is attachable to a process apparatus 30 which can be a pipe, a tank, or any other line or vessel used for carrying a toxic, corrosive or hazardous substance, although the valve 1 also has use in other areas as well. The valve 1 has a sensor 32 attachable thereto to measure a property of the substance. A vent line 90 is also attachable to valve 1, allowing the substance to be evacuated from valve 1 after measurements are taken, or in the event sensor 32 has to be removed.

Figure 1:
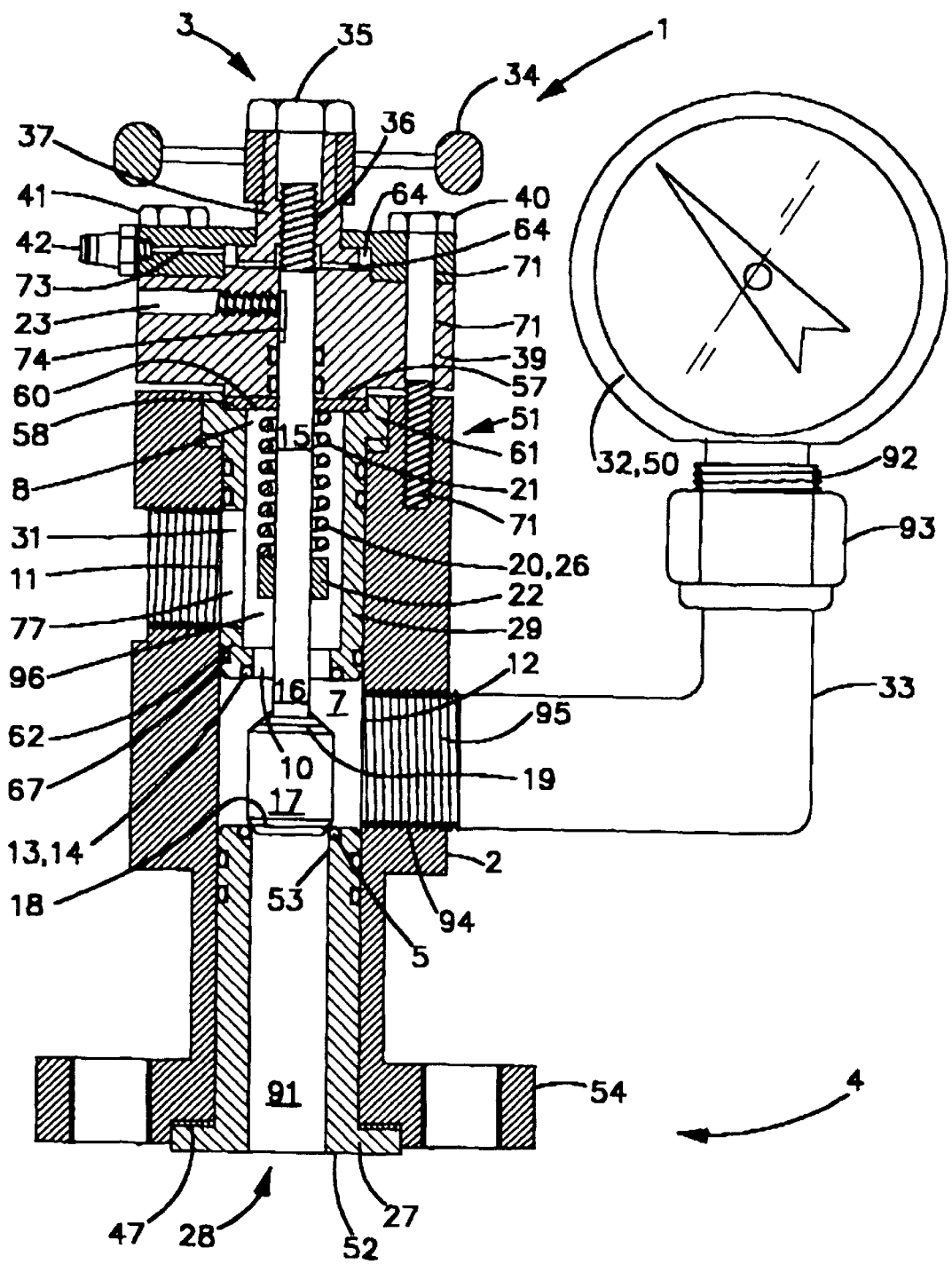
FIG. 1 is a cross-sectional view of an embodiment of the invention.
Figure 2:
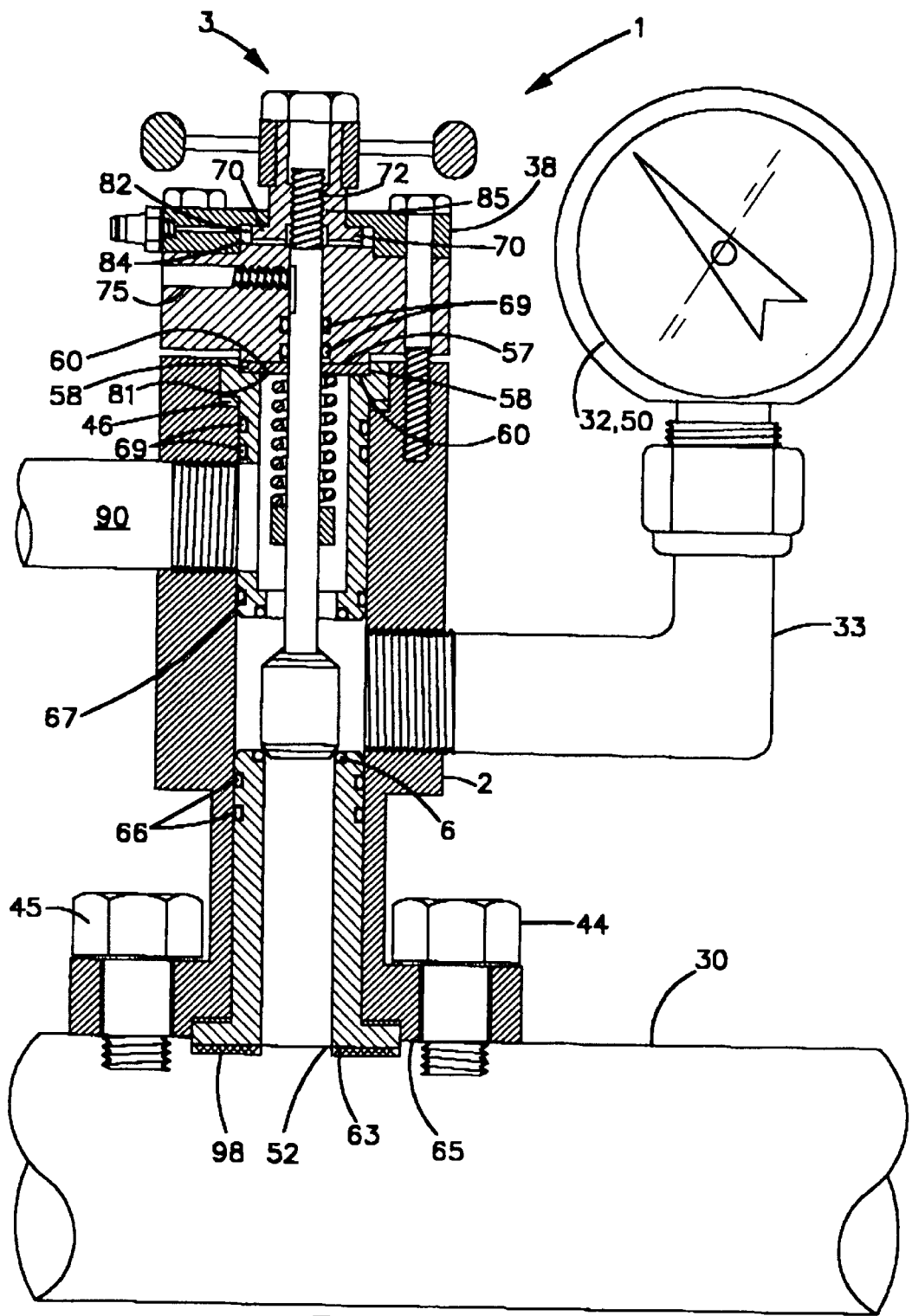
FIG. 2 is another cross-sectional view of an embodiment of the invention.

Shown in FIGS. 1 and 2 is an embodiment of the process instrument isolation valve 1, having a valve body 2 and an actuator 3. Valve body 2 has an inlet end 4 and an upper end 51. A longitudinal bore through valve body 2 forms a stem chamber 7. Valve 1 can be bolted to any process apparatus 30, using bolts 44, 45 which fit through valve flange 54 so that stem chamber 7 is in fluid communication with process apparatus 30 via inlet end 4. Quick-connect couplings and threaded, welded or flanged connections could also be used. Valve 1 has an inlet port 28, a sensor port 12, an upper port 8, and a vent port 11. Second seat port 10 is fluidly positioned between sensor port 12 and vent port 11, while vent port 11 is fluidly positioned between second seat port 10 and upper port 8. Sensor port 12 and vent port 11 are threaded to receive threaded ends of connection lines which will connect to valve 1. In other embodiments not shown, ports 11 and 12 could instead be equipped with other means for connecting lines such as quick-connect coupler-receivers, threaded ends, flanged ends, socket welds, or any other types of connection means known in the art.

Positioned in stem chamber 7 at inlet end 4 is an annular first seat insert 27 having a first seat insert longitudinal bore 91 therethrough which allows fluid communication between process apparatus 30 and stem chamber 7. First seat insert 27 has a process end 52 and a seat end 53. A gasket seal 47 may be interposed between valve flange 54 and first seat insert 27. Seat end 53 forms a first valve seat 5 for the plug 17 positioned on valve stem 15. Seat end 53 is recessed to accept an inlay of hardened seat material forming first valve sealing surface 6, preferably of a material having a hardness in excess of the hardness of the material used to form plug 17. A hardfacing material sold as STELLITE 21, (manufactured by Stoody Deloro Stellite Inc.) having a hardness range of 30–43 on the Rockwell C (Rc) scale may be used for the first valve sealing surface 6, and a plug material of HASTELLOY C-276, (Manufactured by Haynes International, Inc.) having a hardness range of 25–30 Rc, may be used. It should be noted that the hardfacing material could be utilized on plug 17 rather than on first valve sealing surface 6. However, an advantage of placing the hardfacing material on the first valve sealing surface 6 is that, in the event that first valve sealing surface 6 is damaged, it is easily replaceable by replacing first seat insert 27. Attached to process end 52 of first seat insert 27 is a grooved or serrated gasket 63 which allows valve 1 to sealingly mate with the process apparatus 30 which preferably already has thereon a recessed flange 98 to receive valve 1. In the embodiment shown, process end 52 is preferably offset approximately 1/16 of an inch from bottom face 65 of valve body 2. First seat insert 27 also has a pair of seals 66 near seat end 53 to help prevent leaks between first seat insert 27 and valve body 2.

Also positioned in stem chamber 7 at upper end 51 is an annular second seat insert 29 having a second seat insert longitudinal bore 96 therethrough which allows stem 15 to extend through second seat insert 29 and allows fluid communication between second seat port 10 and vent port 11 via aperture 77. Second seat insert 29 has an upper end 61 and a seat end 62. A gasket seal 46 may be interposed between second seat insert 29 and valve body 2. Seat end 62 forms a second valve seat 13 for plug 17 positioned on valve stem 15. Second valve seat 13 is fluidly positioned between sensor port 12 and vent port 11. Seat end 62, like seat end 53 of first seat insert 27, is recessed to accept an inlay of hardened seat material forming second valve sealing surface 14, also preferably constructed of a material having a hardness in excess of the hardness of plug 17. Again, one should note the advantage of utilizing hardfacing material on second valve sealing surface 14 rather than on plug 17, due to the ease of replacing second seat insert 29. Second seat insert 29 has an aperture 77 therein aligned with vent port 11 so that stem chamber 7 and vent port 11 are in fluid communication. Second seat insert 29 has at least one gasket 67 between second seat port 10 and vent port 11, and an additional pair of gaskets 68 between vent port 11 and upper port 8 to minimize the leaks from valve body 2.

In other embodiments, valve body 2 could be constructed such that the inserts 27, 29 are constructed as integral parts of valve body 2 and, hence, are not removable.

Valve stem 15 is slidably and sealingly positioned in valve body 2 and extends into stem chamber 7. Valve stem 15 has a plug end 16 and a threaded upper end 36. Plug end 16 is positioned within stem chamber 7. Plug 17 is attached to valve stem 15 at plug end 16. Plug 17 can be connected to valve stem 15 by any manner known in the art. Preferably, plug 17 is welded onto plug end 16 of valve stem 15.

As stated above, plug 17 is constructed of a metal softer than that of the first valve seat 5 and second valve seat 13, but resistant or inert to chemical attack by the substance in process apparatus 30. Materials such as stainless steel and other chemical resistant materials sold under the trademarks MONEL and HASTELLOY are suitable. Plug 17 is provided with a first plug sealing surface 18, which is a curved surface facing and sealingly engageable with first valve seat 5. Similarly, second plug sealing surface 19 faces and is sealingly engageable with second valve seat 13. When plug 17 is engaged against first valve seat 5 or second valve seat 13, contact occurs substantially along circumferential lines of plug 17 on either first plug sealing surface 18 or second plug sealing surface 19. An annular band of hardfacing material can also be placed onto plug 17 to form the first and second plug sealing surfaces 18, 19.

Valve stem 15 extends upwardly through second seat port 10 in second seat inset 29 and through second seat insert 29, through upper port 8, through seal 60, bellows flange 58, and seal 57 between upper port 8 and packing flange 39, through packing flange 39, and threadably engages valve stem nut 37. Packing flange 39 is affixed atop valve body 2 and holds seal 60 (as discussed below) in place between an inner recessed edge 81 of second seat insert 29 packing flange 39. Valve stem nut 37 is placed above packing flange 39 so that a lubricant cavity 64 of about 1/32 of an inch exists between the top of packing flange 39 and the bottom of valve stem nut 37 and between the outer edge 82 of the flanged bottom 70 of valve stem nut 37 and the inner recessed edge 84 of yoke plate 38. Yoke plate 38 has an aperture therein allowing it to fit over valve stem nut 37 and rest upon its flanged bottom 70 and upon packing flange 39. Yoke plate 38, packing flange 39, and valve body 2 have bolt apertures 71 therein which allow bolts 40, 41 to extend through yoke plate 38 and packing flange 39 and threadingly engage valve body 2, thereby holding the three components together.

Yoke plate 38 has lubricant fitting 42 attached thereto on an outside edge to allow lubrication of threads 72 between valve stem 15 and valve stem nut 37. Yoke plate 38 has a lubricant passageway 73 therein which extends between lubricant fitting 42 and lubricant cavity 64.

Below the upper end 36, valve stem 15 is provided with a notch 74. A set screw 23, preferably a dog point set screw, threadably engages a set screw aperture 75 in packing flange 39 and engages notch 74, preventing valve stem 15 from rotating during valve operation. Notch 74 extends longitudinally along valve stem 15, allowing valve stem 15 to travel between valve seats 5 and 13. Additional gaskets 69 are placed within packing flange 39 to help minimize any leaks that may occur through the valve stem 15 through packing flange 39 and/or the set screw aperture 75.

Valve 1 may also incorporate a sealing shroud 20. Sealing shroud 20 has a stem end 22 attached to the valve stem 15 and a yoke end 21 connected to the valve body 2. Stem end 22 is fixedly attached to valve stem 15 by seal welding. Yoke end 21 is attached to bellows flange 58. FIGS. 1 and 2 show a sealing shroud 20 in the form of a bellows seal 26. Stem end 22 of bellows seal 26 is seal welded to valve stem 15, while yoke end 21 is seal-welded to bellows flange 58. Bellows flange 58 bears on an inner recessed edge 81 separated by annular gasket seal 60. Bellows flange 58 has serrated upper and lower edges. Atop bellows flange 58 is another annular gasket seal 57 upon which packing flange 39 rests. Gasket seals 57 and 60 sealingly engage valve stem 15 providing a seal between stem chamber 7 and the exterior of valve 1. Though not shown in the Figures, sealing shroud 20 could also comprise packing or o-ring seals.

The invention also includes an actuator 3. Actuator 3 comprises a handle 34 having a handle nut 35 thereon. Handle 34 engages valve stem nut 37 and effects rotation of valve stem nut 37 via female threads 85 which engage the male threads 72 on stem 15. In other embodiments, actuator 3 could be operated in any manner known in the art including pneumatic and electronic control (also including remote operation).

A sensor 32 is attached to the valve 1 and is in fluid communication therewith via sensor extension 33. Sensor 32 may also connect directly with valve 1. Sensor 32 is provided with a threaded end 92 which can engage a corresponding threaded end 93 of sensor extension 33 or the corresponding threads 94 in sensor port 12. Sensor extension 33 is provided with a male threaded end 95 which can threadably engage sensor port 12. Sensor 32 and sensor extension 33 could also be connected to each other and/or valve 1 in other ways, for instance with flanged connections. Any type of sensor 32 can be connected to valve 1 or sensor extension 33 such that properties of the substance in process apparatus 30, such as temperature, pressure and others can be measured.

The invention also includes a vent line 90 attached to valve 1 at the vent port 11. Preferably, vent line 90 has male threads, which threadably engage the female threads along vent port 11. Vent line 90 and valve 1 could also be connected to each other in other ways, for instance with flanged connections. Vent line 90 extends between valve 1 and a desired component elsewhere so that any substance which is evacuated from valve 1 can be disposed of properly.

In operation, with valve 1 adjusted so that plug 17 is in a closed position (shown in the Figures) with first plug sealing surface 18 in sealing contact with first valve sealing surface 6 on first valve seat 5, handle 34 is then turned so that the engaged threads of valve stem nut 37 and threaded upper end 36 of valve stem 15 force valve stem 15 upwards, urging second plug sealing surface 19 into sealing contact with second valve sealing surface 14 on second valve seat 13. This action allows process materials to enter stem chamber 7, pass through sensor port 12, and enter sensor extension 33 where a measurement, such as pressure (via pressure sensor 50), can be taken. Once the measurement is complete, handle 34 is turned so that the engaged threads of valve stem nut 37 and valve stem 15 force valve stem 15 downward until plug 17 is again in the closed position. As this occurs, process material then vents back through stem chamber 7, through second seat port 10, through second seat insert aperture 31, through sensor port 12, and out of the valve 1 to disposal through vent line 90. If a sensor 32 is broken or has failed, the operator can simply change out the sensing device 32, reconnecting a new one to sensor port 12 and repeating the process, or by connecting a new sensor 32 to sensor extension 33.

Materials used in construction of valve 1 and exposed to the substance flowing through process apparatus 30should be inert with respect to the substance. For instance, for corrosive materials, it may be desirable to construct valve body 2 from stainless steel, and valve stem 15 and bellows 26 from stainless steel or materials sold under the name HASTELLOY (such as HASTELLOY 276). For non-corrosive application, carbon steel may be sufficiently durable. Gasket materials, such as 0-rings, should also be inert to the materials flowing through the valve. Fluorocarbon materials may be appropriate (such as VITON, available from Dupont), polytetrafluoroethylene ("PTFE"), or carbon and glass filled PTFE may be suitable. PTFE, however, has a tendency to "cold flow" under pressure and, if used, it may be desirable to include serrated edges or ridges on the surfaces against which the PTFE bears to help resist cold flow. Other suitable gasket materials may include compressed asbestos, such as chrysotile asbestos, available as GARLOCK 900 from Garlock, Inc., and nitrile, available as BUNA-N from Dupont. Unless otherwise stated, all connections are sealed so as to minimize leak paths that may result in the release of the substance in process apparatus 30 which enters the valve for measurement.

Although the preferred embodiment has been described, it will be appreciated by those skilled in the art to which the present invention pertains that modifications, changes, and improvements may be made without departing from the spirit of the invention defined by the following claims.

We claim:

1. The combination comprising a process apparatus, a valve fluidly connectable to said process apparatus, and a sensor in fluid communication with said valve, whereby the properties of substances can be measured without exposure of said substances to the environment, said valve comprising:

a valve body having an inlet end fluidly connectable to process apparatus;

a first valve seat positioned in said valve body, said first valve seat having a first valve sealing surface;

a stem chamber extending through said valve body, said stem chamber having an upper port, a first seat port, a second seat port, a vent port and a sensor port, said upper port, said first seat port, said vent port, and said sensor port fluidly communicating with said stem chamber, said second seat port fluidly positioned between said sensor port and said vent port, said vent port fluidly positioned between said second seat port and said upper port;

a second valve seat fluidly positioned in said valve body between said sensor port and said vent port, said second valve seat having a second valve sealing surface;

a valve stem slidably and sealingly positioned in said valve body and extending into said stem chamber, said valve stem having a plug end positioned within said stem chamber;

a plug attached to said plug end of said valve stem, said plug having a first plug sealing surface and a second plug sealing surface, said first plug sealing surface adapted to be sealingly engageable with said first valve sealing surface, said second plug sealing surface adapted to be sealingly engageable with said second valve sealing surface; and an actuator connected to said valve stem.

2. The combination according to claim 1 wherein said first and second plug sealing surfaces include an annular band of material having a hardness greater than that of said first and second valve sealing surfaces.

3. The combination according to claim 1 wherein said first and second valve sealing surfaces include an annular band of material having a hardness greater than that of said first and second plug sealing surfaces.

4. The combination according to claim 1 further comprising a sealing shroud member positioned in said stem chamber, said valve stem extending through said sealing shroud, said sealing shroud having a yoke end and a stem end, said yoke end being sealingly engaged with valve body above said vent port, said stem end of said sealing shroud being sealingly connected to said valve stem above said plug.

5. The combination according to claim 4 wherein said sealing shroud member comprises a bellows seal, packing or o-ring seals.

6. The combination according to claim 1 further comprising an annular first seat insert, said first seat insert sealingly engageable with said valve body through an inlet in said valve body near said inlet end, said first seat insert having a first seat insert longitudinal bore therein, said first seat longitudinal bore allowing fluid communication between said process apparatus and said stem chamber through said first seat port, said first seat insert including said first valve sealing surface.

7. The combination according to claim 1 further comprising an annular second seat insert sealingly engageable with said valve body through said upper port, said second seat insert having a second seat insert longitudinal bore therein, said second seat longitudinal bore allowing said stem to extend therethrough, said second seat insert including said second valve sealing surface, said second seat insert further including an aperture aligned with said vent port such that said stem chamber and said vent port are in fluid communication.

8. The apparatus according to claim 1 further comprising a vent line fluidly connectable to said vent port.

* * * * *